United States Patent [19]
Martinis et al.

[11] Patent Number: 5,634,718
[45] Date of Patent: Jun. 3, 1997

[54] PARTICLE CALORIMETER WITH NORMAL METAL BASE LAYER

[75] Inventors: John Martinis, Boulder, Colo.; Michael Nahum, Sudburg, Mass.; Steve Castles, Lusby, Md.

[73] Assignee: The United States of America as represented by the Secretary of Commerce, Washington, D.C.

[21] Appl. No.: 281,360

[22] Filed: Jul. 27, 1994

[51] Int. Cl.$^6$ .......................... G01K 17/00; G01K 13/00
[52] U.S. Cl. .................. 374/32; 374/142; 374/45
[58] Field of Search .............. 374/32, 45, 141, 374/142; 505/847, 849

[56] References Cited

U.S. PATENT DOCUMENTS

| | | | |
|---|---|---|---|
| 3,906,231 | 9/1975 | Fletcher et al. | |
| 3,939,706 | 2/1976 | Pinson | 374/32 |
| 4,687,342 | 8/1987 | Betzler et al. | 374/32 |
| 4,739,382 | 4/1988 | Blouke et al. | |
| 4,765,749 | 8/1988 | Bourgade et al. | 374/32 |
| 4,869,598 | 9/1989 | McDonald | 374/176 |
| 4,904,869 | 2/1990 | Schneider | |
| 4,935,626 | 6/1990 | Schneider | |
| 4,943,559 | 7/1990 | Severin | 374/176 |
| 4,964,735 | 10/1990 | Sasnett et al. | 374/32 |
| 5,090,819 | 2/1992 | Kapitulnik | 374/176 |
| 5,171,733 | 12/1992 | Hu | 374/121 |
| 5,179,072 | 1/1993 | Bluzer | |
| 5,316,380 | 5/1994 | Secemski | 374/32 |
| 5,321,276 | 6/1994 | Kurakado et al. | |

FOREIGN PATENT DOCUMENTS 1413432  11/1975  United Kingdom ............ 374/32

OTHER PUBLICATIONS

Boulanger P. et al., "An absolute calorimeter for high power $CO_2$ laser", J. Phy. E: Scient. Instrum., vol. 6, pp. 559–560 (Great Britain, 1973).

Thermal Detectors As X-Ray Spectrometers, Moseley, Mather, & McCannon Phys. 56(5), Sep. 1, 1984.

Design Analysis Of A Novel Hot-Electron Microbolometr, Nahum and Richards, IEEE Transactions On Applied Superconductivity, 3, 2124(1993).

Primary Examiner—Diego F. F. Gutierrez
Attorney, Agent, or Firm—Patent Law Offices of Rick Martin, P.C.

[57] ABSTRACT

A detector of X-ray and the like in which very good resolution of energy can be obtained. The device is based on two basic components. The first is the x-ray absorber in which an x-ray interacts with a film and converts its energy into heat. Because the absorber is operated at cryogenic temperatures, approximately the range of 0.01 Kelvin to 1 Kelvin, its heat capacity is small and causes a measurable temperature rise. The second component of the invention is a base layer of normal metal which absorbs the heat generated by the x-ray. The third component of the invention is the method to detect the temperature rise. This thermometer is based on a normal metal-insulator-superconductor tunnel junction, where part of the base layer is the normal metal. When the tunnel junction is electrically biased at a voltage slightly below the gap voltage of the superconductor, the electrical current that flows through the junction is sensitively dependent on the temperature of the normal metal.

18 Claims, 5 Drawing Sheets

PARTICLE CALORIMETER WITH NORMAL METAL BASE LAYER

CROSS REFERENCE PATENTS

Incorporated herein by reference are U.S. Pat. Nos. 4,869,558, 5,090,819, and 4,943,559.

FIELD OF INVENTION

The present invention relates to micro calorimeters used as x-ray spectrometers. A normal metal base layer collects energy produced by an x-ray interacting with an absorber, with the heat generated by the x-ray raising the base layer temperature which is held near absolute zero temperature. A normal metal-insulator-superconductor (NIS) tunnel junction(s) detects current changes corresponding to the energy of the incident x-ray.

BACKGROUND OF THE INVENTION

GLOSSARY

Photon—a quantum of electromagnetic radiation, equal to Planck's constant multiplied by the frequency in hertz.

Normal Metal—Any metal not in a superconducting state, e.g. silver, gold, copper.

Quasi Particle—fundamental energy excitation of a superconductor similar to an electron Microbolometer—device for measuring very small energy levels of microwave and infrared energy.

Tunnel junction—an electron device that allows quantum mechanical tunneling of electrons through an insulating barrier whose thickness is a few nanometers.

Particle—any object which has a quanta of energy that can be absorbed by the calorimeter. examples are: optical, ultra violet, x-ray, and gamma ray photons; proton, neutron and alpha particles; ions, and neutral atoms; molecules; and phonons.

Phonon—a quantum of vibrational energy of atoms in a solid, equal to Plank's constant multiplied by the frequency in hertz.

Semimetal—metal such as bismuth with very low conduction-electron density.

Superconductor—certain metals, alloys, and compounds in which the resistance drops essentially to zero below a critical temperature near absolute zero.

Radiation detectors are crucial components of many commercial and scientific measurement apparatuses. Because of the wide use of radiation detectors, there has been much development of these kinds of detectors to measure the many different types of radiation and to measure them more accurately. Although the invention discussed here can be used as a general purpose radiation detector, we will initially describe the detection of X-rays since this is the most immediate application of the present invention. Our x-ray detector gives more accurate energy resolution and higher speed than other competing technologies.

Every element in nature emits X-rays with a characteristic or a set of characteristic energies. When an X-ray is detected and its energy accurately determined, then one can simply infer from the energy the constituent element it came from. Typically one measures an unknown sample with many different constituent elements. The x-rays and their energies collected from the unknown sample is then displayed according to energy in an x-ray spectrum, from which the constituent elements can be deduced. This basic idea is behind a large class of analytical measurement instruments that serves a wide variety of industries ranging from mining (ore composition) to semiconductor fabrication (composition and contaminant determination).

Energy resolution of the x-ray detector is a major specification for these type of x-ray radiation detectors. The better the resolution for the detection of x-rays, the more reliably one can "tag" that particular x-ray with an element. Because of other imperfections and background x-ray signals that are always present in a measurement system, improved x-ray energy resolution also allows one to better determine how much (the percentage) of a given element is present in an unknown sample.

It is always useful to take an x-ray spectrum with as many x-ray events (or counts) as possible. This makes the "signal" of the x-rays as large as possible as compared with the background "noise" that is always present in a real measurement. The capability to take a spectrum with more counts are generally given through two other important specifications. One is the area of the x-ray detector. Since the detector always has to be located at a finite distance away from the sample, it can intercept only a fraction of x-rays that are emitted from the sample. Increasing the area of the detector is thus desirable as it subsequently increases the number of x-rays that can be detected. The last important specification is the maximum permissible count rate of the x-ray detector. One typically operates these instruments by taking an x-ray spectrum such that it gives a fixed number of total counts. The spectrum is then accumulated over a time from typically several minutes to hours. A faster count rate allows the x-rays to be collected over a smaller time period. Improvements in speed can be very important for real applications. For example, a factor of 100 increase in maximum count rate reduces a measurement time of 10 hours to one that only takes six minutes. This large decrease in measurement time is obviously very important for scientific and commercial applications.

Commercial instruments today are primarily based on two detector technologies. The most widely used is called an Energy Dispersive Spectrometer (EDS) which uses a crystal of silicon cooled to 77 Kelvin. At low temperature the electrons in the silicon are frozen into their atomic positions and no electrical current flows. However, when an x-ray interacts with the silicon it breaks the atomic bond of an electron and allows it to freely flow through the crystal. An amplifier then measures the electrical current from these electrons moving through the crystal, with the magnitude of the current being proportional to the energy of the x-ray that interacted with the crystal. (The higher the x-ray energy, the more electrons are freed from their positions, giving more electrical current.) This technology is now quite mature and has leveled out to a resolution of about 130 eV (electron volts), and maximum count rate of about 3 thousand/second, and a collection area of 2–4 $mm^2$.

CHART I

SUMMARY OF ENERGY DISPERSIVE SPECTROMETER (EDS)

| | |
|---|---|
| Method of Operation | X-ray hits a sensor and creates an electric current |
| Resolution | 130 eV for 5000 eV X-ray |
| Sampling Speed | 3,000–10,000 counts per second |
| Collection Area | 2–4 $mm^2$ |
| Operating Temperature | Usually 77k, liquid nitrogen |

Wavelength Dispersive Spectrometers (WDS) constitute a second type of detector technology which diffract x-rays from a crystal at angles that depend on the x-ray energy. These detectors have a good energy resolution of approximately 5 eV, but because the effective collection area is very small and its cost is high, only about 5% of the instruments are based on this detector.

CHART II

SUMMARY OF WAVELENGTH DISPERSIVE SPECTROMETER (WDS)

| | |
|---|---|
| Method of Operation | X-ray reflects off a crystal in a measurable angle |
| Resolution | 5 eV for 5,000 eV x-ray |
| Sampling Speed | To 50,000 counts/sec |
| Collection Efficiency | Collection efficiency 1–10% of EDS method |
| Operating Temperature | Ambient (300 kelvin) |

A more ideal detector would have the ease of use and large collection area of the EDS detector, but with the high resolution of the WDS type system. Since the beginning of the 1980's, there has been work to try to reach this goal with new type of x-ray detectors that operate at very low temperatures (less than 4 kelvin). Although many approaches have been investigated, summarized below are two approaches that have achieved resolution better than 100 eV, a resolution that at least becomes competitive with the present types of EDS systems.

One type of detector uses superconducting-insulator-superconducting (SIS) tunnel junctions. The principle of operation of this device is similar to the EDS type detector, although here the way the current is generated through the device is physically different. In a superconductor, the electrons are bound into "Cooper pairs" which form the superconducting state. An x-ray interacting with the superconductor then breaks these Cooper pairs and forms excitations of the superconductor called quasiparticles. These quasiparticles are analogous to the free electrons which are produced in the EDS system when electrons are freed from their atomic positions. The method of collection of the quasiparticles differ from the EDS detector. Here, a superconducting "tunnel junction" is placed in the region where there are quasiparticles. The quasiparticles quantum mechanically tunnel through the junction, which is then registered as an electrical current. Although the basic principle of this detector has been well known, the experimental challenge is to ensure that most of the quasiparticles tunnel through the tunnel junction. Various important improvements have been made in the geometry of a device by Boothe and by other workers to force the quasiparticles to diffuse and then trap themselves in a region near the tunnel junction. The latest work to improve tunneling is disclosed in U.S. Pat. No. 5,321,276 (1994) to Kurakado et al.

Another type is the x-ray microcalorimeter as first reported by Moseley et al. as noted in the NASA experiments described below. This device is based on a very simple and well known calorimetry principle where energy is absorbed and then converted into heat. For this x-ray detector, the subsequent temperature rise of the heat is proportional to the x-ray energy. Because the actual x-ray energy is quite small, the heat capacity of the detector has to also be very small so that a relatively large temperature rise is observed. This is accomplished by operating the device at very low temperatures (less than 0.3K), making the detector small, and by having the detector made out of non-metallic materials which, at low temperatures, have much lower heat capacities than metals. The detectors are typically made out of micro-machined silicon which is an insulator at low temperatures. The thermometer is made from doping a part of the silicon so that it just slightly conducts electrical current at these low temperatures—this doping makes the electrical resistance temperature dependent. Improvements in the detector have improved on initial performance greatly. The improvements have been to use separate x-ray absorbing elements, made from a superconductor or semi-metal which have very low heat capacity, and then connecting these absorbers to the main body of the micro-machined silicon in such a way that the heat transfer is accomplished in a uniform way across the body of the absorber. At present, the resolution of these detectors are very good, 8 eV for the best device and typically 12–14 eV is found. However, one major drawback of this detector is it slow speed. Typical fall-time response of the thermal pulses is 1 to 10 mS. Although this is adequate for some scientific applications, this is much slower than desired for commercial applications.

The invention described here is based on the microcalorimeter idea. Although when reduced to practice the invention uses a superconducting-insulator-normal metal tunnel junction, it is not related to the superconducting-insulator-superconducting tunnel junction detectors discussed above: our detector measures the heat rise in the normal metal, not the presence of superconducting quasiparticles as in the latter case of the Booth et al. (Applied Physics letters, Vol. 50, No. 5, pg 293–295, 1987) experiments.

Summarized below is all the known relevant prior art including the publication source.

Thermal detectors as x-ray spectrometers Moseley, Mather and McCannon, J. Appl. Phys, 56(5), Sep. 1, 1984 teaches an apparatus of the microcalorimeter type to measure the very small energy pulses of x-ray photons striking a silicon target. By 1994 these NASA experiments had achieved the extremely high resolution of 8–12 eV. The experiments run at 0.1K. However, the method and apparatus is very slow even compared to commercially available instruments. The NASA experiments are only achieving speeds of recording 100 events per second as compared to industry standards of 10,000 events per second. Thus, for lab use, a spectrometric measurement could take several hours versus several minutes.

The most recent experimental apparatus uses a Pb target for the x-rays. A thermal connection exists to a layer of silicon which is suspended in a vacuum supported by legs. A thermistor implant is imbedded in the layer of silicon. The thermistor current is measured through leads of superconducting Al carried in the support legs. The silicon is an insulator having low heat capacity. Since Δ Temperature=Δ Energy/C, where C is the Heat Capacity, the low heat capacity of the silicon accounts for the extremely high resolution of the device. These experiments are the closest known relevant prior art to the present invention.

Design Analysis of a Novel Hot-Electron Microbolometer, Nahum and Richards, IEEE Transactions On Applied Super-conductivity 3, 2124 (1993) teaches the use of super-conducting antennas to measure the infrared radiation. The rf current from the superconducting antenna is dissipated into a resistive metal strip. The resulting temperature rise of the electrons in the metal strip are measured as a change in the voltage across a normal metal-insulator-superconductor tunnel junction which is biased at a constant current.

U.S. Pat. No. 4,869,558 to McDonald discloses a superconducting device operating below the transition temperature having multiple layers of thin film. The device operates on the temperature dependent inductance with highest sensitivity when at least one of the layers is thin relative to the magnetic penetration depth of the superconducting material utilized.

U.S. Pat. No. 4,739,382 to Blouke et al. discloses a charge-coupled device package used for temperature sensing. This sensor operates at $LN_2$ temperature.

U.S. Pat. No. 4,943,559 to Severin et ai. discloses a temperature sensor comprising a thin layer of superconducting material the thickness of which varies over its length. The Tc of the material is portional to its thickness. The temperature of the sensor is derived by the electronics controlling the bias temperature of the sensor.

U.S. Pat. No. 5,090,819 to Kapitulik discloses a superconducting bolometer which derives temperature by controlling the temperature of a superconductor at the midrange of the superconductivity/non-superconductivity transition region and measuring the resistance change due to impairing radiation.

U.S. Pat. No. 5,171,733 to Hu discloses a bolometer formed by a high TC superconductor and an antenna.

U.S. Pat. No. 5,179,072 to Bluzer discloses a multispectral super-conductive detector using geometric and kinetic inductances.

U.S. Pat. No. 5,321,276 to Kurakado et al. discloses a superconductor-insulator-superconductor tunnel junction radiation sensing device includes first and second superconductor electrodes and a tunnel barrier layer interposed therebetween. The tunnel barrier layer is made up of a thin-wall portion and a thick-wall portion each formed of a superconductor or an insulator, and each having opposite surfaces respectively contacting the first and second superconductor electrodes, and each extending adjacent each other in a same horizontal plane between the first and second electrodes. The invention improves the Booth tunnel junction design of wide and narrow super conductor plate combinations.

The difference in our invention and previous microcalorimeters is the essential use of normal metal in the thermal circuit of the calorimeter. The present invention measures the temperature rise of the electrons in the normal metal, as opposed to previous experiments which measured the temperature rise of an insulating material where the heat was carried by vibrations of the atoms in the insulator (these vibrations are call phonons). Experiments have generally not tried to use a normal metal in the detector because it is well known that metals have large heat capacities. Thus, it was generally believed that their inclusion would reduce the thermal signal of the detector. We show in this invention that their use is quite beneficial to the circuit as long as small amounts of metal are used and are placed properly in the circuit. The performance of the circuit is dramatically improved while not increasing the heat capacity of the metal to unacceptable levels. The most important improvement is that the operation speed is increased by a factor of about 100 over Moseley al.

SUMMARY OF THE INVENTION

In summary, the main object of the present invention is to provide a normal metal base layer in proximity to an absorber, which is then thermally connected to a normal-insulator-superconductor (NIS) junction, thereby creating a sensitive microcalorimeter.

Another object of the present invention is to thermally isolate the absorber by means of superconducting leads and a thin substrate.

Other objects of this invention will appear from the following description and appended claims, reference being had to the accompanying drawings forming a part of this specification wherein like reference characters designate corresponding parts in the several views.

The main purpose of this detector is to measure x-rays with a very good energy resolution, possibly as good as 0.2 eV. Because different elements emit x-rays with a unique energy spectrum, this detector gives a more precise determination of the x-ray spectrum. A better and more unambiguous measurement of the elemental composition of a sample is the practical result of the present invention. The extremely good resolution may also permit an analysis of the chemical bonding of the elements. Because x-rays of differing energies can be measured simultaneously, the sample analysis can be done more quickly than with the differactive crystal spectrometer (WDS). Such an increase in speed is useful for measuring small trace quantities of an element. This detector also allows very precise position and time determination of the x-ray event, with respective resolution of possible less than one micrometer and one microsecond. This is a unique measurement for a spectrometer.

The operation of the device can be described in four process steps. First, the absorption of the x-ray event converts the x-ray into thermal energy which causes a temperature rise in a thermally isolated target. Next, the thermal energy is absorbed by a normal metal base layer. Next, this temperature rise of the base layer is measured with a thermometer and converted into an electrical signal. Finally, the electrical signal is amplified and measured.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
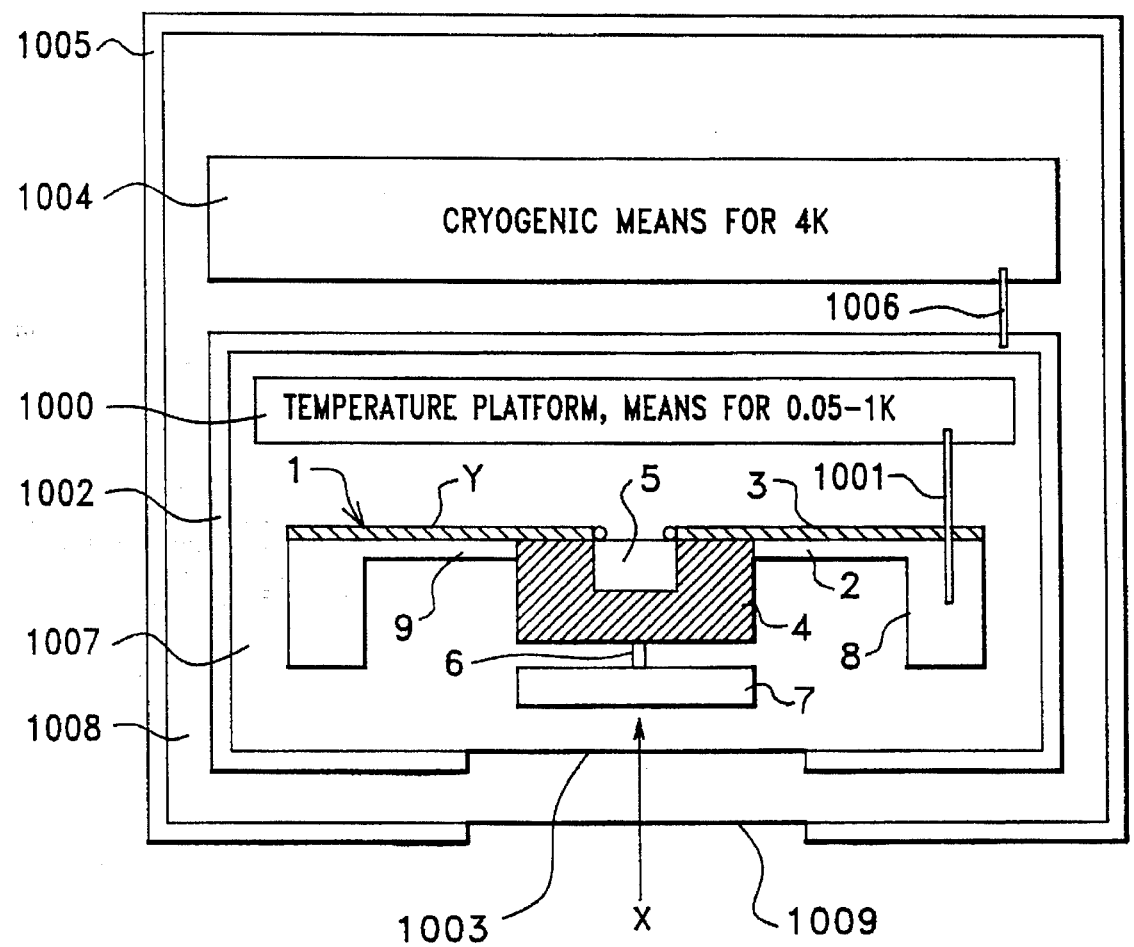
FIG. 1 (Prior Art) is a cross sectional view of a NASA experimental calorimeter.

Referring first to FIG. 1 the most recent NASA experimental calorimeter 1 is shown. An x-ray absorber 7 is made of Pb. It has a thermal connection 6 to a thermally isolated island of silicon 4 on a silicon wafer 8. A thermistor 5 is embedded in the silicon island 4. The silicon wafer 8 is placed in a cryogenic environment at 0.1 kelvin. Thermal connection and mechanical support of silicon island 4 to silicon wafer 8 is obtained by legs 2, 9. On top of legs 2, 9 are superconducting A1 leads 3, Y. The x-rays shown by arrow X heat the Pb absorber 7. The heat is conducted to the silicon island 4. The thermistor 5 changes its resistance, which is detected by a field effect transistor amplifier (not shown). A thermal connection 1001 is made from the silicon wafer 8 to a temperature platform 1000 which provides a means of refrigeration to 0.05K. to 1K. The calorimeter is enclosed in a thermal shield 1002 which is at 4K. This thermal shield 1002 provides a low infrared radiation background environment. A thermal connection 1006 is made from the thermal shield 1002 to a cryogenic means 1004 for producing a 4K. temperature. The entire system is enclosed in an instrument case 1005, and thermal isolation is provided by a vacuum space 1007 and 1008. An x-ray X passes through x-ray windows 1009 and 1003 before striking the Pb absorber 7. The present invention described in FIGS. 2 through 10 operates in this prior art environment common to known calorimeters.

Figure 2:
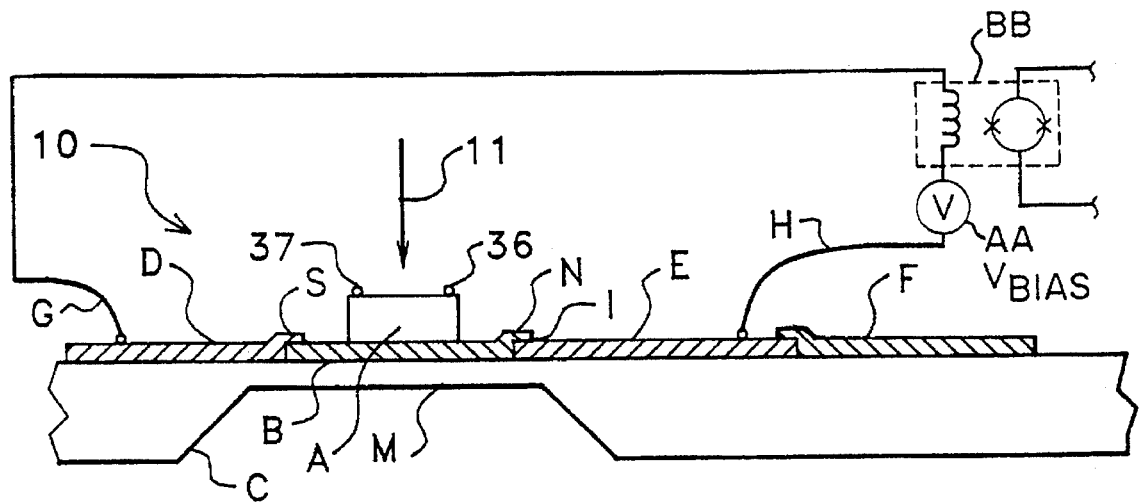
FIG. 2 is a cross sectional view of the preferred embodiment.

Referring next to FIG. 2 the preferred embodiment particle calorimeter 10 is shown.

An incident x-ray 11 interacts in the absorber A. The absorber A are operated at cryogenic temperature ranges of 0.01 k to 1 k. The absorber consists of a dense enough material (large atomic number), such as gold or bismuth, and a thick enough layer so that the x-ray 11 has a large probability of interaction. For example, a one micrometer thick layer of gold has an interaction probability of about 50% for a 5 keV x-ray. This gold layer may be made thinner if a lower energy x-ray is observed. The x-ray event heats up the absorber A. This heat is deposited into the electrons and lattice vibrations (phonons) of absorber A. The heat distributes itself into a base layer B and to the substrate C. Base layer B can be made from 10 to 100 nm of a normal metal not in a super conducting state such as copper or silver. Because the substrate C is not electrically conducting and has a much lower heat capacity than A and B, most of the heat is retained in A and B. There are several ways in which this heat can be lost. The first is through any contacts to the base layer B. To trap the thermal energy in B, we connect to one side B a superconducting lead D, which can be made out of a material such as A1, Pb, or Nb. The thermal conductivity of the superconducting lead D is small so that little of the heat in base layer B is transferred to superconducting lead D. Thus, this normal metal superconductor (NS) contact provides an electrical connection, but no thermal conductance. On the other side of base layer B is the normal-insulator-superconductor tunnel junction N. The junction N also provides thermal isolation to base layer B. Another heat loss mechanism is the loss of phonons through the substrate C. Initially during the x-ray absorption, the thermalization of the x-ray energy goes into hot-electrons and phonons, with the phonons having large energies of approximately 10–40 kelvin. If these phonons escape to the substrate C then the resolution of the detector would be degraded. The purpose of the thinned substrate M (aka membrane) is to reduce the heat capacity of the substrate C under the base layer B and to reflect back the high energy phonons so that they are re-absorbed in absorber A and base layer B. Membrane M is preferably made of silicon nitride at a thickness of 0.5 micron. Typical permissible range of thickness is 0.1 to 1 μm. Because the phonons strongly interact with metal, the phonon energy is readily absorbed by absorber A and base layer B.

Electrode E can be made from A1, and has a thin oxidized layer I to form a normal metal-insulator-superconductor (NIS) tunnel junction N. This structure consists of a base layer with a second superconducting lead superimposed beneath an insulating layer which insulating layer is superimposed beneath the base layer. This junction N is a thermometer for the electrons in base layer B. When the junction is biased at a voltage bias slightly below the superconducting gap of the A1, the current through the NIS junction N depends on the temperature of base layer B. An advantage of this thermometer is that when electrons tunnel through the junction; the metal of base layer B is not electrically heated by the tunnel junction N. The electrons which tunnel into the superconductor E are quasiparticles which diffuse in the aluminum until they recombine or release their energy into the normal metal F. Heat released here diffuses into the metal F, the super cold substrate C, and finally to the thermal ground of the sample (not shown).

The electrical connection to the device is made through leads G and H which connect to superconducting lead D and superconductor E respectively. The leads 6, H are voltage biased by a voltage source AA and the current measured by these leads G, H is that flowing through the tunnel-junction thermometer N. This current can be measured with a superconducting quantum interference device (SQUID) (BB) which is a sensitive amplifier of current. The fast thermal time constant of the absorber and the large bandwidth of the SQUID amplifier allow pulses of duration 1 to 100 microseconds to be measured. The output signal from the SQUID is a voltage pulse, of which the amplitude is approximately proportional to the incident x-ray energy.

Figure 10:
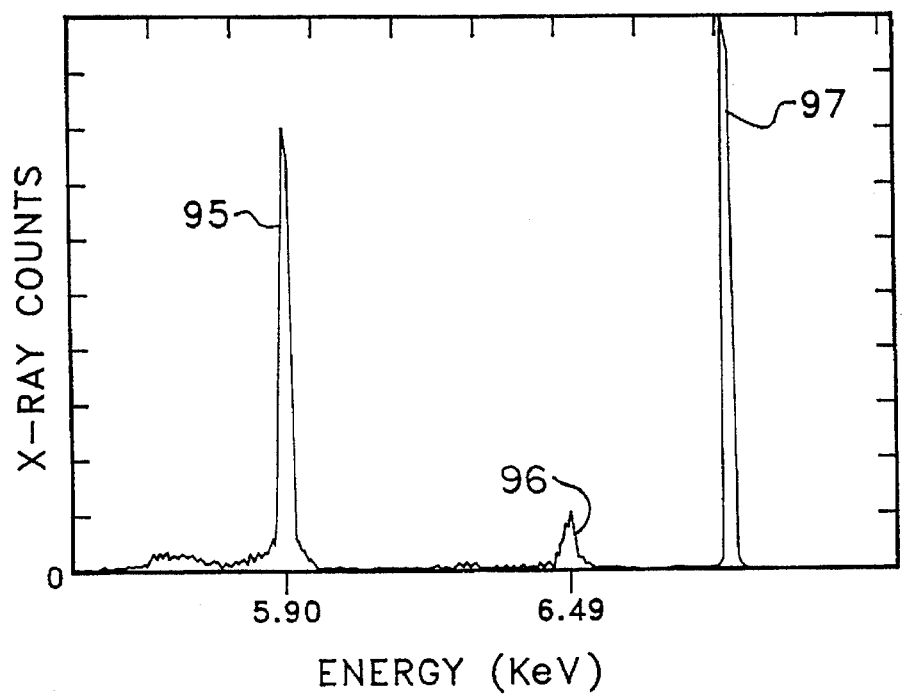
FIG. 10 is an experimental x-ray spectrum showing the x-ray lines Kα 95 and Kβ 96 of manganese, and of the calibration heat pulse 97. The resolution of the detector is 17 eV full width at half maximum.

FIG. 10 shows an experimental x-ray spectrum taken with the described particle calorimeter for manganese x-rays. The peak shown by 95 is the K$\alpha$x-ray line, and the peak shown by 96 is the K$\beta$x-ray line. The peak at 97 was produced by the calibration heat pulse. The resolution of the detector is 17 eV full width at half maximum.

The preferred embodiment uses bismuth as the absorber A. The thickness of absorber A ranges from 0.25 to 10 microns. The area is about 1 mm$^2$. The base layer B is preferably a thin layer 0.01–0.1 micron) of silver. The area is about 1 mm$^2$.

ALTERNATIVE EMBODIMENTS

Figure 7:
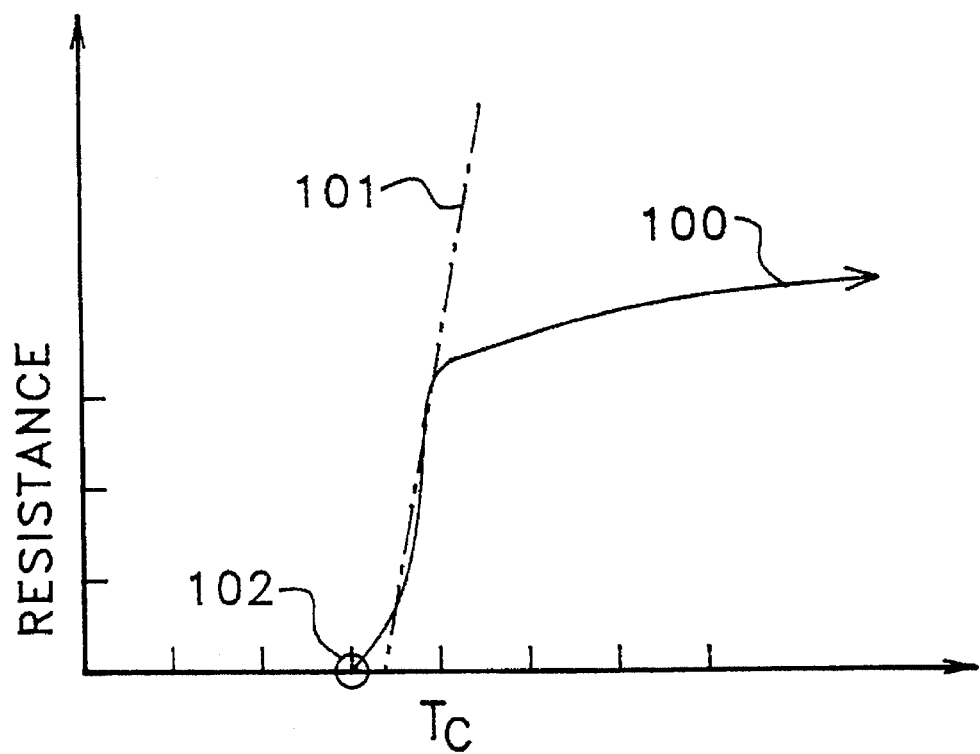
FIG. 7 is a graph showing the relationship of temperature and resistance of a typical superconducting material at and above the transition temperature range where the superconducting state to a non-superconducting state.
Figure 8:
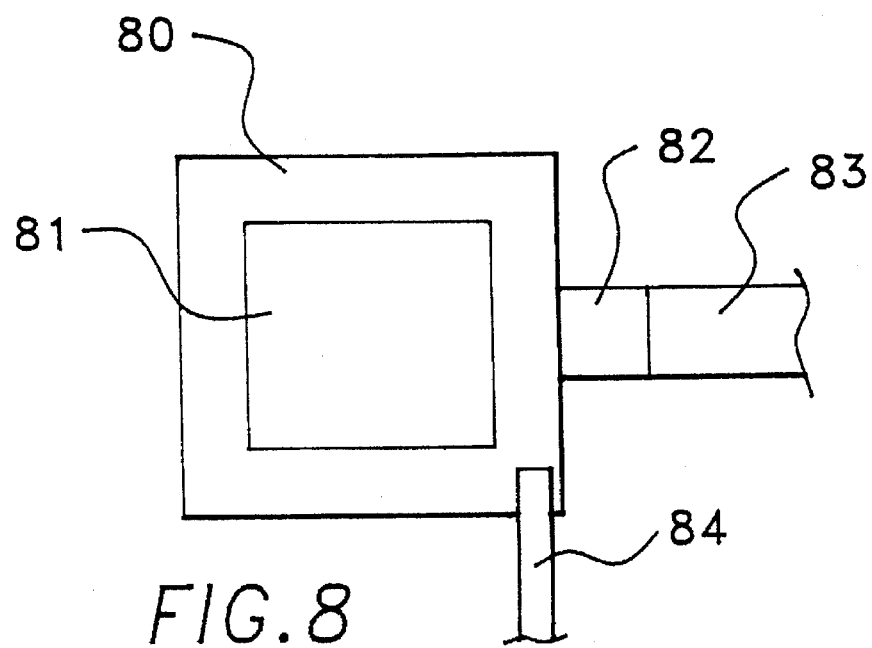
FIG. 8 is a top plane view of an alternative embodiment showing a superconducting transition edge thermometer.

1. In FIG. 8 an alternative means to detect the temperature change of absorber 81 and base layer 80 would be to use a superconducting transition edge thermometer 82 instead of the NIS junction N. The means for measuring temperature change in the base layer comprises a second superconducting lead operating at a superconducting-non-superconducting transition temperature. Electrical contact to thermometer 82 is made through superconduction lead 84 and superconductor 83. Such transition edge thermometers are taught by U.S. Pat. Nos. '558, '819, and '559 noted above and incorporated herein by reference. In FIG. 7 we show a resistance versus temperature plot of such a thermometer. The superconducting and normal states are given by 102 and 100 respectively. The transition region where the thermometer would be temperature biased is shown by 101.

2. The portion of the substrate C referred to as the membrane M under the absorber A may not have to be thinned. The intrinsic poor coupling of electrons to phonons at very low temperatures may be used to thermally isolate the electrons. This may degrade the resolution of the x-ray detector, but may simplify the construction. This embodiment may also be used to detect phonons generated in the substrate.

3. The absorber A may not have to be a normal metal such as gold. A superconductor such as Pb may be used, with the advantage that after the initial x-ray absorption the temperature of the superconductor is well below its transition temperature so that it re-enters the super-conducting state. The electrical contact between absorber A and base layer B must be good so that any quasi-particle excitation in absorber A can be quickly absorbed by base layer B. Another embodiment for absorber A is a constriction from a semimetal such as bismuth or mercury-telluride. This metal has a high atomic number to absorb x-rays, but has a low heat capacity. An insulator may also be used for the absorber A, where phonons carry the heat into the base layer B. The advantage of these three types of absorbers is that a large area for the absorption of x-rays may be obtained without a large heat capacity, thus allowing a larger area absorber to be constructed.

4. Materials other than the semiconductor silicon can be used for the substrate C. Silicon may absorb some of the high energy photons into localized excitations and provide an unwanted trap of energy, thus degrading the resolution of the detector.

5. The detector can also measure other energy sources. For example, a low energy x-ray or ultraviolet photon may also be absorbed. In this case, the interaction length of the radiation is short enough so that absorber A can be made thinner. This reduces the heat capacity of absorber A, thus improving the sensitivity of the entire particle calorimeter.

6. The accuracy of the temperature rise may be degraded if the temperature of base layer B is measured before the heat has time to equilibrate. The tunnel junction N can be operated at, for example, a lower voltage bias during the equilibration time. After this time the bias can be brought back to the optimal value and then used to accurately measure the temperature.

7. The resolution of the detector may degrade if the electrons do not come to equilibrium before the NIS tunnel junction N measures the electron temperature of base layer A thermal resistance may then be placed between the base layer B and the tunnel junction N to produce more electron interactions which thermalize the electron energy and slows the heat diffusion to the junction N.

8. A plurality of NIS junctions may be used to determine and correct any positional dependence of the absorber A to the energy. For example, a junction may be placed on each side of the absorber. To first order, the sum of the junction signals would give the total energy, the difference of signals would give positional information.

Figure 3:
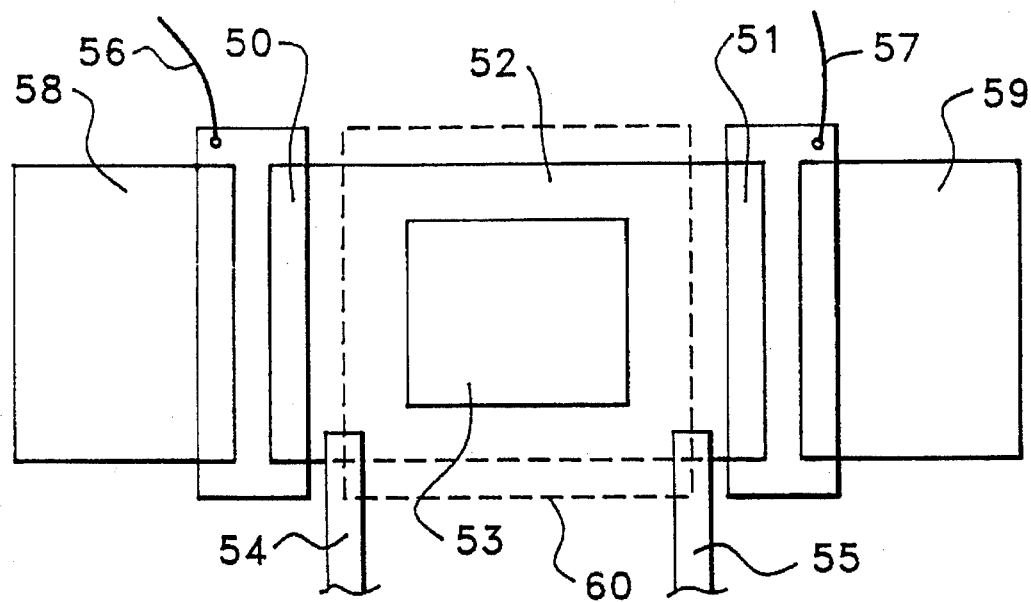
FIG. 3 is a top plain view of an alternate embodiment having a pair of the NIS junctions to enable x-ray strike location determination and energy measurement without any position dependence.

FIG. 3 functions analogously to the embodiment shown in FIG. 2 as can be seen by the table below. The differences are as follows.

Referring to FIG. 3 two NIS junctions, 50 and 51 are shown. The dual NIS junctions serve to average the thermal signal for increased accuracy as well as yield positional information. A third or fourth NIS junction may be used for positional information in a second direction.

Figure 5:
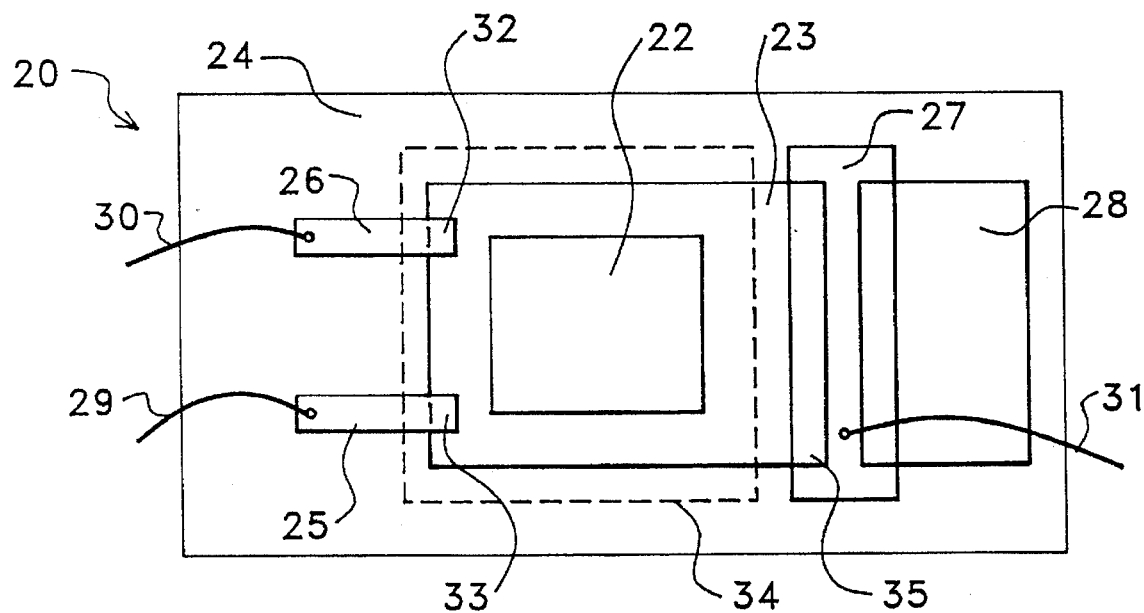
FIG. 5 is a top plain view of an alternative embodiment of a particle calorimeter having a means to calibrate the thermometer via a heat pulse.

| Table Showing Analogous Component of FIGS. 1, 3, 5, 8 TO FIG. 2 | FIG. 1 | FIG. 2 | FIG. 3 | FIG. 5 | FIG. 8 |
|---|---|---|---|---|---|
| Thermal Connection | 6 | | | | |
| Silicon Island | 4 | | | | |
| Legs | 2 | | | | |
| Legs | 9 | | | | |
| Particle Calorimeter | 1 | 10 | | 20 | |
| X-ray | X | 11 | | | |
| Absorber | 7 | A | 53 | 22 | 81 |
| Base Layer | | B | 52 | 23 | 80 |
| Substrate | 8 | C | | 24 | |
| Superconducting Lead | | D | | 25 | 84 |
| Superconducting Lead #2 | | | | 26 | |
| Superconductor | | E | | 27 | 83 |
| Normal Metal | | F | 58 | 28 | |
| Normal Metal #2 | | | 59 | | |
| Lead | 3 | G | | 29 | |
| Lead | Y | H | 56 | 31 | |
| | | | 57 | | |
| Heat Pulse Lead | | | | 30 | |
| SN Contact | | S | | 32 | |
| | | | | 33 | |
| Membrane | | M | 60 | 34 | |
| Thermometer Number 1 | 5 | N | 50 | 35 | 82 |
| Thermometer Number 2 | | | 51 | | |
| "Close" Absorber Position | | 36 | | | |
| "Far" Absorber Position | | 37 | | | |
| Insulator Of Tunnel Junction | | I | | | |

Figure 9:
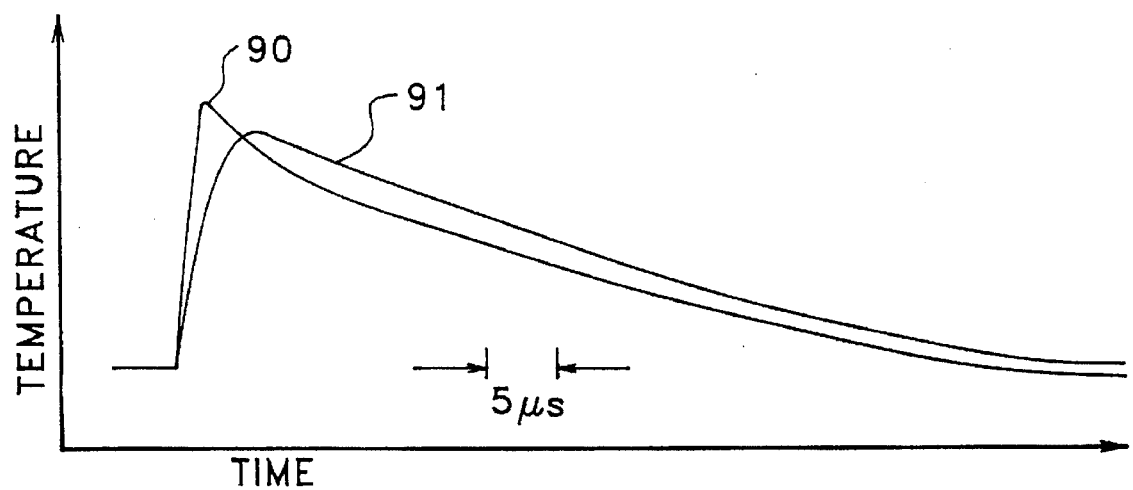
FIG. 9 is a plot of the experimental data of temperature versus time for a pulse close to and far from an NIS junction.

9. One can also obtain position information from the shape of the heat pulse. FIG. 9 shows experimental data for the time dependence of the temperature for x-rays interacting close to an NIS junction 90, and farther away from junction 91. The close and far positions are indicated by 36 and 37 respectively on FIG. 2. This positional information may be used to correct for the energy. The shape of the rising part of the signal 90, 91 depends on strike position, which may be accomplished by measuring the rise time of the signal.

Figure 6:
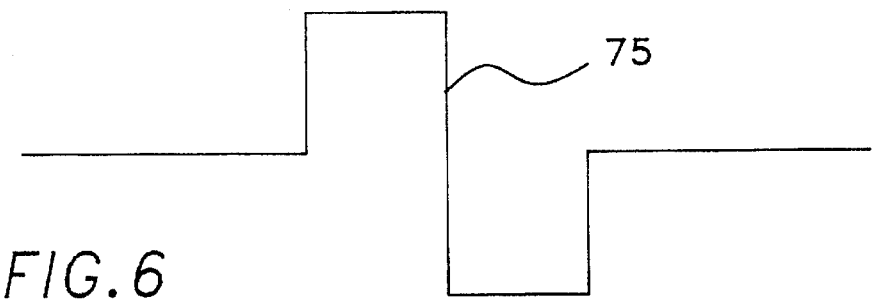
FIG. 6 is a plot of the heat pulse wave form used in FIG. 5.

10. FIGS. 5 and 6 show a calibration method for this embodiment. A calibration pulse 75, an example shown in FIG. 6, generates a positive then negative going pulse of current, with equal magnitudes, into the base layer 23 of FIG. 5. The length of the pulse is typically from 30 to 500 ns.

FIG. 5 functions analogously to the embodiment shown in FIG. 2 as can be seen by the table discussed previously. The differences are as follows.

Two superconducting leads 25 and 26 make contact to the base layer 23. The current of the heat pulse is sent through these leads and base layer 23 via leads 29 and 30. The NS contacts are 32 and 33.

In this manner the calibrated energy pulse is measured by the NIS junction 35. Because the average current of the heat pulse 75 is zero, this current tends not to be picked-up by the NIS junction 35.

11. Other photon energies can be measured by the present invention by varying the absorber thickness along the lines of this chart:

| NAME | ENERGY LEVEL | ABSORBER THICKNESS |
|---|---|---|
| Optical | .1–10 eV | .001–0.5 mm |
| Ultra Violet | 10–100 | .05–.3 μm |
| X-ray | 100 eV–20 keV | .3–5 μm |
| Gamma | >20 KeV | >5 μm |

12. A field-effect transistor, with possibly a matching transformer, may also be used as an electrical read-out of the NIS junction.

13. Arrays of absorbers and tunnel junctions may be used to obtain positional information and to increase the area of the absorber. The tunnel junctions may be connected in parallel and then connected to a single SQUID in order to read-out all the detectors with a single SQUID amplifier.

14. When an NIS junction is biased at voltages below the superconducting gap, the electrons in the normal metal base are cooled. This occurs because only hot electrons above the fermi energy of the metal of base layer B can tunnel out of the base layer B. This junction may thus be used as a refrigeration means.

Figure 4:
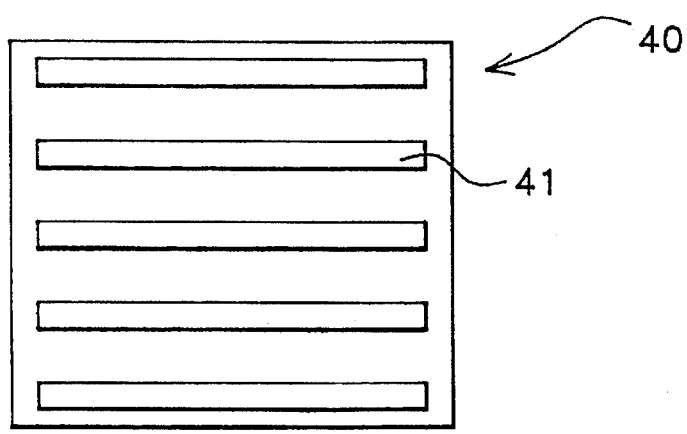
FIG. 4 is a top plan view of an alternate embodiment of a base layer having ridges.

15. FIG. 4 shows a further enhancement to the base layer 40, where the rest of the particle calorimeter is not shown. Ridges of base layer 41 has a greater thickness of metal than base layer 40. These ridges function to increase the thermal conductivity of heat through the base layer without greatly increasing its heat capacity.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A particle calorimeter functioning to measure the energy of a particle comprising:
   a particle absorber layer superimposed upon a base layer thereby providing an efficient heat transfer between the absorber and base layers;
   said particle absorber layer further comprising a composition selected from the group consisting of normal metals, insulators, semi-metals, and super-conductors;
   a means for measuring a temperature change in the base layer, wherein the temperature change functions to detect the particle energy striking the particle absorber layer;
   said base layer further comprising a composition selected from the group consisting of normal metals not in a superconducting state;
   said particle calorimeter having an ambient environment comprising a cryogenic temperature; and
   said base layer further comprising a means for providing a weak thermal contact with a super cold substrate, functioning to enable the base layer to react to minute temperature changes to incoming particles.

2. The particle calorimeter of claim 1, wherein the means for providing a weak thermal contact further comprise a thinning of the super cold substrate into a membrane beneath the base and particle absorber layers.

3. The particle calorimeter of claim 2 wherein the membrane further comprises a composition of silicon nitride having a thickness of 0.1 to 1 micron.

4. The particle calorimeter of claim 1 further comprising a first superconducting lead D connected to the base layer, thereby forming a superconductor-normal metal (SN) contact, functioning to thermally insulate the base layer while allowing electrical contact through the first superconducting lead.

5. The particle calorimeter of claim 4 wherein the means for measuring a temperature change in the base further comprises a second superconducting lead E superimposed beneath an insulating layer which insulating layer is superimposed beneath the base layer, thereby forming a normal metal-insulator superconductor (NIS) junction which generates a current in proportion to the temperature change in the base.

6. The particle calorimeter of claim 5 further comprising a normal metal lead forming a normal metal-superconductor (NS) junction with the second superconducting lead of the NIS junction, functioning to absorb the heat of quasi particles produced at the NIS junction away from the absorber, base layer and superconducting lead.

7. The particle calorimeter of claim 5 further comprising a SQUID functioning to measure the current generated by the NIS junction.

8. The particle calorimeter of claim 5 further comprising a plurality of NIS junction(s) each superimposed beneath the insulating layer and each generating a current, thereby enabling a calculation of a strike position on the absorber and a total energy calculation of the particle.

9. A particle calorimeter of claim 5, wherein said NIS junction further comprises a refrigeration means for the base layer functioning to transmit hot electrons from the base layer through the NIS junction.

10. The particle calorimeter of claim 4 further comprising a second SN contact, wherein a calibrating pulse of heat can be obtained by creating a current with zero average flowing through the two SN contacts and the base layer.

11. The particle calorimeter of claim 4 wherein the means for measuring temperature change in the base layer further comprises a second superconducting lead operating at a superconducting - non-superconducting transition temperature.

12. The particle calorimeter of claim 1 wherein the cryogenic temperature further comprises a temperature in the range of 0.01 kelvin to 1 kelvin.

13. The particle calorimeter of claim 1 wherein the particle further comprises an x-ray photon and wherein the absorber layer further comprises a thickness of approximately 0.25 to 10 microns, and an area of approximately 1 $mm^2$.

14. The particle calorimeter of claim 1 wherein the particle further comprises an x-ray photon and wherein the base layer further comprises a thickness of 0.02–0.1 micron, and an area of approximately 1 $mm^2$.

15. The particle calorimeter of claim 1 wherein the base layer further comprises ridges functioning to conduct heat faster without greatly increasing heat capacity.

16. The particle calorimeter of claim 1 wherein the particle absorber layer further comprises a thickness ranging from 0.001 micron to 50 microns, thereby enabling the measurement of a particle energy level ranging from 0.1 eV to >20 Kev.

17. The particle calorimeter of claim 1 further comprising a means for determining a strike position of a particle by measuring a shape of the temperature change versus a time function, wherein time signatures of the temperature change function to yield position and total energy of the particle.

18. A method of measuring the energy and a strike position of a particle comprising:

- superimposing a particle absorber layer upon a base layer thereby providing an efficient heat transfer between the absorber and base layers;
- said particle absorber layer further comprising a composition selected from the group consisting of normal metals, insulators, semi-metals, and super-conductors;
- measuring a temperature change in the base layer, wherein the temperature change functions to detect the particle energy striking the particle absorber layer;
- said base layer further comprising a composition selected from the group consisting of normal metals not in a superconducting state;
- placing said particle calorimeter in an ambient environment comprising a cryogenic temperature;
- said base layer further comprising a means for providing a weak thermal contact with a super cold substrate, functioning to enable the base layer to react to minute temperature changes to incoming particles; and
- determining a strike position of a particle by measuring a shape of the temperature change versus a time function, wherein time signatures of a temperature change function to yield position and total energy data.

* * * * *